April 14, 1970     TOMOKAZU KAZAMAKI     3,506,339
COMPACT RETROFOCUS WIDE ANGLE OBJECTIVE LENS SYSTEM
Filed Sept. 8, 1967     2 Sheets-Sheet 1
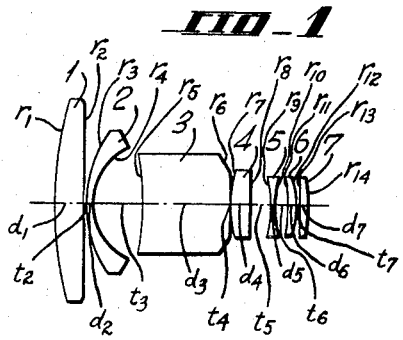
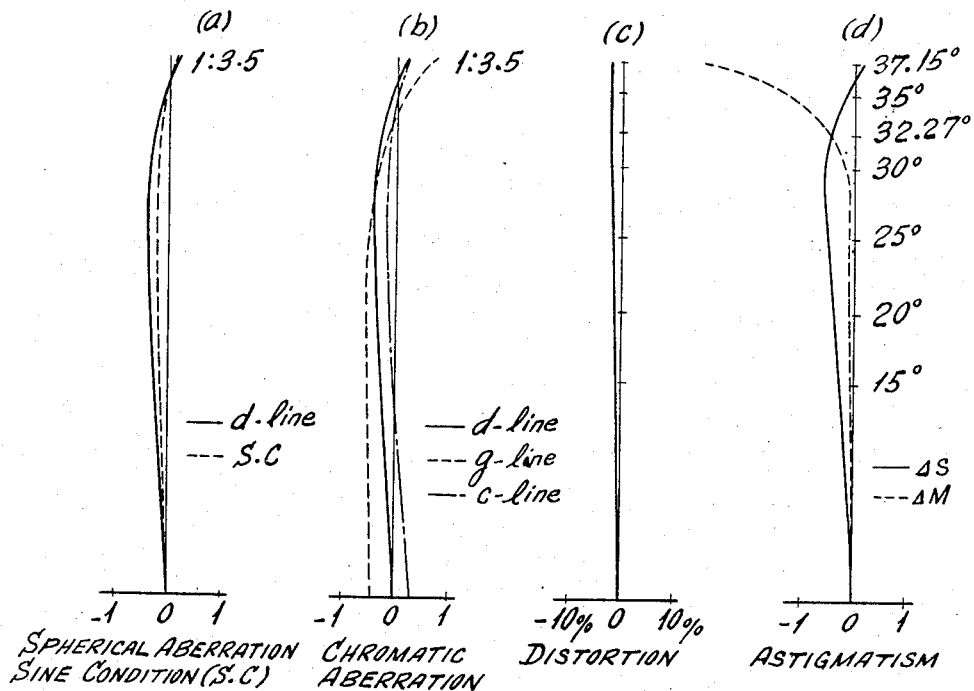
INVENTOR
TOMOKAZU KAZAMAKI

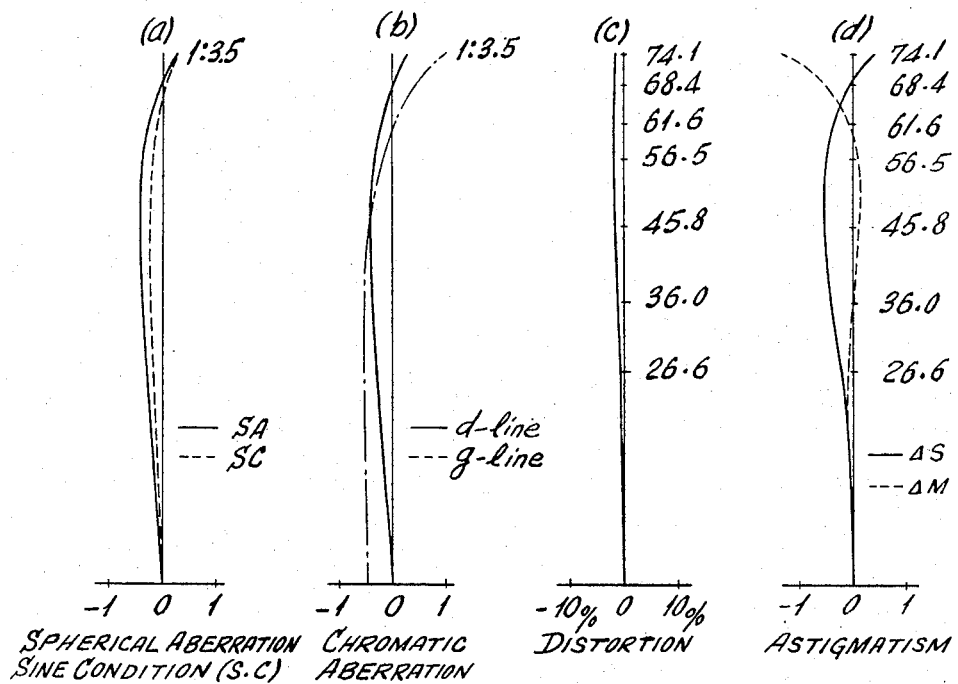

United States Patent Office 3,506,339
Patented Apr. 14, 1970

3,506,339
COMPACT RETROFOCUS WIDE ANGLE OBJECTIVE LENS SYSTEM
Tomokazu Kazamaki, Tokyo-to, Japan, assignor to Asahi Kogaku Kogyo Kabushiki Kaisha, Tokyo-to, Japan, a corporation of Japan
Filed Sept. 8, 1967, Ser. No. 666,327
Claims priority, application Japan, Sept. 10, 1966, 41/59,723
Int. Cl. G02b 9/00
U.S. Cl. 350—214                                                 1 Claim

ABSTRACT OF THE DISCLOSURE

A compact retrofocus wide angle objective lens system possessing low astigmatism and highly acceptable distortion characteristics comprises seven lenses, the first, fourth, sixth and seventh lenses being positive, the second and fifth lenses being negative and the third lens being a thick low power lens either positive, negative or of zero power. The lens system satisfies the following conditions:

$$|F_{1.2}| \geq F/0.75, \quad F_{1.2} < 0$$

$$\infty \geq |r_5| \geq 0.7F, \quad r_5 < 0$$

$$d_3 \geq 0.3F$$

$$1.5F \geq t_2 + d_3 + t_3 \geq 0.5F$$

$$F/1.5 \leq |F_{1.2.3.4.5}| \leq F/0.5$$

$$F_{1.2.3.4.5} < 0$$

$$0.5F < r_{10} < 2F$$

wherein F is the resultant focal length of the full lens system; $F_{1.2 \ldots i}$ is the resultant focal length of the first to the $i$th lens; $r_5$ and $r_{10}$ are the radii of curvature of the front face of the third lens and the rear face of the fifth lens respectively; $t_2$ and $t_3$ are the distances between the first and second lenses and the second and third lenses respectively; and $d_3$ is the thickness of the third lens.

BACKGROUND OF THE INVENTION

The present invention relates generally to improvements in lens systems and it relates particularly to an improved compact retrofocus camera objective lens system.

The conventional inverted telephoto or retrofocus lens system possesses numerous drawbacks and disadvantages and usually represents a compromise in design. Two methods have been generally employed in the design of inverted telephoto lens systems of long back foci. In accordance with the first method the power of the front negative lens group is reduced and a greater spacing is provided between the front negative lens group and the principal lens group and in accordance with the second method the power of the front negative lens group is increased and a smaller spacing is provided between the front negative lens group and the principal lens group. The first method results in a large diameter front lens and a greater overall length of the lens system with the accompanying drawback of awkwardness and large size. The large size of the front lens of a fisheye objective, for example, characterizes the lens system of the first method. An important disadvantage of the second method of design is the great difficulty encountered in achieving suitable aberration corrections.

SUMMARY OF THE INVENTION

A principal object of the present invention is to provide an improved camera objective lens system.

Another object of the present invention is to provide an improved retrofocus wide angle objective lens system.

A further object of the present invention is to provide lens system of the above nature characterized by its small size and excellent optical properties.

The above and other objects of the present invention will become apparent from a reading of the following description taken in conjunction wiith the accompanying drawings which illustrate and characterize a preferred embodiment of the present invention.

In a sense the present invention contemplates the provision of a retrofocus wide angle lens system comprising seven lenses and satisfying the following conditions:

$$|F_{1.2}| \geq F/0.75, \quad F_{1.2} < 0 \tag{1}$$

$$\infty \geq |r_5| \geq 0.7F, \quad r_5 < 0 \tag{2}$$

$$d_3 \geq 0.3F \tag{3}$$

$$1.5F \geq t_2 + d_3 + t_3 \geq 0.5F \tag{4}$$

$$F/1.5 \leq |F_{1.2.3.4.5}| \leq F/0.5$$
$$F_{1.2.3.4.5} < 0 \tag{5}$$

$$0.5F < r_{10} < 2F \tag{6}$$

wherein F is the resultant focal length of the full lens system; $F_{1.2 \ldots i}$ is the resultant focal length of the first to the $i$th lens; $r_5$ and $r_{10}$ are the radii of curvature of the front face of the third lens and the rear face of the fifth lens respectively; $t_2$ and $t_3$ are the spacings between the first and second lenses and between the second and third lenses respectively; and $d_3$ is the thickness of the third lens. Advantageously the first lens is positive, the second lens is a negative meniscus lens with its front face convex, the third lens is of greater thickness than the other lenses and is of zero or low positive or negative power, the fourth lens is positive, the fifth lens is double-concave, the sixth lens is a positive meniscus lens with its front face concave, and the seventh lens is positive.

The reduced power of the front negative lens group comprising the first two lenses, as dictated by condition (1), results in an increase in the size of the first lens, but functions to effect a reduction in the aberrations. However, any excess in the increase of the size of the first lenses is avoided as a consequence of conditions (2) and (3). A reduction in the size of the first lens is achieved by the front face of the third lens, with a radius of curvature $r_5$, curving toward the object side as much as possible, although good-results are achieved with the third lens front face substantially flat.

The condition that the sum of the thickness of the third lens and the spacings between the first and second lenses and between the second and third lenses being greater than 0.5F functions to produce a longer back focus. However, if the aforesaid sum exceeds 1.5F then the size of the first lens becomes excessively large thereby necessitating condition (4). Conditions (5) and (6) cooperate to correct astigmatism.

The retrofocus wide angle lens system in accordance with the present invention is compact, has a front lens of comparatively small diameter and possesses excellent optical properties, being highly corrected in coma aberration and astigmatism, and in the lens system of the subject type the available amount of peripheral light is sufficiently great.

BRIEF DESCRIPTION OF THE DRAWINGS

FIGURE 1 is a longitudinal sectional view of an obective lens system embodying the present invention;

FIGURES 2(a) to (d) are aberration curves of said lens system with respect to an infinitely spaced object wherein (a) illustrates the spherical aberration and sine condition, (b) illustrates the spherical chromatic aberration with respect to the d-line, g-line and c-line, (c) illustrates the distortion and (d) illustrates the astigmatism with the solid line indicating sagittal image points and the broken line meridional image points; and FIGURES 3(a) to 3(d) are aberration curves corresponding to FIGURES 2(a) to 2(d) but with respect to an object located at a distance 50F.

DESCRIPTION OF THE PREFERRED EMBODIMENT

Referring now to the drawings and particularly FIGURE 1 thereof which illustrates a preferred embodiment of the present invention, the improved objective lens system comprises seven coaxially positioned lenses designated successively from the front to the rear as lenses 1 to 7. The first lens 1 is a positive lens of thickness $d_1$, index of refraction $n_1$, a front face of radius of curvature $r_1$ and rear face of radius of curvature $r_2$. The second lens 2 is a negative meniscus lens spaced from the first lens 1 a distance $t_2$ and having a thickness $d_2$, an index of refraction $n_2$, a convex front face of radius of curvature $r_3$ and a concave rear face of radius of curvature $r_4$.

The third lens 3 is a thick lens of zero power, or of small negative or positive power, and is spaced from second lens 2 a distance $t_3$ and has a thickness $d_3$ an index of refraction $n_3$ a front face of radius of curvature $r_5$ and a rear face of radius of curvature $r_6$. The fourth lens 4 is positive and spaced from the third lens 3 at a distance $t_4$ and has a thickness $d_4$, an index of refraction $n_4$, a front face of radius of curvature $r_7$ and a rear face of radius of curvature $r_8$. The fifth lens 5 is double-concave and is spaced from the fourth lens 4 a distance $t_5$, and has a thickness $d_5$, an index of refraction $n_5$, a front face of radius of curvature $r_9$ and a rear face of radius of curvature $r_{10}$. The sixth lens 6 is a positive meniscus lens and is spaced from the fifth lens 5 a distance $t_6$ and has a thickness $d_6$, an index of refraction $n_6$, a concave front face of radius of curvature $r_{11}$ and a convex rear face of radius of curvature $r_{12}$. The seventh lens 7 is positive and is spaced from the sixth lens 6 a distance $t_7$ and has a thickness $d_7$, an index of refraction $n_7$, a front face of radius of curvature $r_{13}$ and a rear face of radius of curvature $r_{14}$.

The distances between lenses are axially measured between the confronting faces of adjacent lenses and the lens thicknesses are also axially measured.

The following Table 1 recites the dimensions and parameters of a specific example of the present lens system having a focal length F=100 mm. and an aperture of 1:35. The radii of curvatures and the lens spacings and thicknesses are designated as above identified and the indices of refraction and the Abbé numbers are the numerators and denominators respectively of the correspondingly designated lens refractive indices as above identified.

TABLE 1

| | | | | | | |
|---|---|---|---|---|---|---|
| $r_1$ | 500.000 | $d_1$ | 19.05 | $n_1$ | 1.67003/47.2 |
| $r_2$ | 6899.728 | $t_2$ | 0.53 | | |
| $r_3$ | 82.000 | $d_2$ | 4.20 | $n_2$ | 1.62041/60.3 |
| $r_4$ | 42.739 | $t_3$ | 33.70 | | |
| $r_5$ | −180.000 | $d_3$ | 57.00 | $n_3$ | 1.65160/58.5 |
| $r_6$ | −197.913 | $t_4$ | 0.50 | | |
| $r_7$ | 80.000 | $d_4$ | 14.00 | $n_4$ | 1.72000/42.0 |
| $r_8$ | −725.315 | $t_5$ | 14.50 | | |
| $r_9$ | −74.000 | $d_5$ | 2.00 | $n_5$ | 1.69895/30.0 |
| $r_{10}$ | 112.600 | $t_6$ | 6.00 | | |
| $r_{11}$ | −270.000 | $d_6$ | 7.00 | $n_6$ | 1.62041/60.3 |
| $r_{12}$ | −54.310 | $t_7$ | 0.30 | | |
| $r_{13}$ | −1,000.000 | $d_7$ | 6.00 | $n_7$ | 1.62041/60.3 |
| $r_{14}$ | −107.077 | | | | |

The following Table 2 sets forth the Seidel coefficients and sums of the specific lens system described above with a stop positioned between the fourth lens 4 and the fifth lens 5.

TABLE 2

| | $S_1$ | $S_2$ | $S_3$ | P | $S_5$ |
|---|---|---|---|---|---|
| 1 | 0.001 | 0.008 | 0.034 | 0.080 | 0.489 |
| 2 | 0.000 | −0.008 | 0.088 | −0.005 | −0.814 |
| 3 | 0.235 | 0.075 | 0.024 | 0.466 | 0.157 |
| 4 | −6.368 | 1.409 | −0.312 | −0.895 | 0.267 |
| 5 | 0.002 | −0.020 | 0.171 | −0.219 | 0.407 |
| 6 | −0.013 | 0.032 | −0.082 | 0.199 | −0.292 |
| 7 | 5.749 | 1.259 | 0.275 | 0.523 | 0.174 |
| 8 | 1.406 | −0.900 | 0.576 | 0.057 | −0.406 |
| 9 | −9.612 | 2.437 | −0.017 | −0.555 | 0.297 |
| 10 | −4.810 | −2.101 | −0.918 | −0.365 | −0.560 |
| 11 | 0.140 | 0.238 | 0.406 | −0.141 | 0.450 |
| 12 | 8.399 | −1.248 | 0.185 | 0.704 | −0.132 |
| 13 | −0.056 | 0.088 | −0.138 | −0.038 | 0.277 |
| 14 | 6.391 | −1.226 | 0.235 | 0.357 | −0.113 |
| Sum | 1.475 | 0.043 | −0.071 | 0.167 | 0.203 |

As seen in FIGURE 2 which illustrates the aberration curves of the specific lens system with respect to an object located at infinity and in FIGURE 3 which illustrates the aberration curves of the lens system with respect to an object located at a distance 50F, the present lens system is characterized by a low astigmatism and by a distortion which is inconspicuous since there is no abrupt change thereof in the region of the greater angle of view.

I claim:

1. A retrofocus wide angle lens system comprising seven consecutively designated lenses with fourteen consecutively designated lens faces and possessing the following parameters:

| | | | | | |
|---|---|---|---|---|---|
| $r_1$ | 5.00000F | $d_1$ | .1905F | $n_1$ | 1.67003/47.2 |
| $r_2$ | 68.99728F | $t_2$ | .0053F | | |
| $r_3$ | .82000F | $d_2$ | .0420F | $n_2$ | 1.62041/60.3 |
| $r_4$ | .42739F | $t_3$ | .3370F | | |
| $r_5$ | −1.80000F | $d_3$ | .5700F | $n_3$ | 1.65160/58.5 |
| $r_6$ | −1.97913F | $t_4$ | .0050F | | |
| $r_7$ | .80000F | $d_4$ | .1400F | $n_4$ | 1.72000/42.0 |
| $r_8$ | −7.25315F | $t_5$ | .1450F | | |
| $r_9$ | −.74000F | $d_5$ | .0200F | $n_5$ | 1.69895/30.0 |
| $r_{10}$ | 1.12600F | $t_6$ | .0600F | | |
| $r_{11}$ | −2.70000F | $d_6$ | .0700F | $n_6$ | 1.62041/60.3 |
| $r_{12}$ | −.54310F | $t_7$ | .0030F | | |
| $r_{13}$ | −10.00000F | $d_7$ | .0600F | $n_7$ | 1.62041/60.3 |
| $r_{14}$ | −1.07077F | | | | | wherein F is the resultant focal length of the full lens system, $F_{1.2...i}$ is the resultant focal length of the first to the $i$th lens; $r_n$ is the radius of curvature of the $n$th lens face; $d_i$ is the thickness of the $i$th lens; $t_i$ is the spacing between the $i$th and the next previous lens; and $n_i$ is the index of refraction and the Abbé value of the $i$th lens.

References Cited

UNITED STATES PATENTS 2,785,603  3/1957  Cook _____ 350—214
3,410,632  11/1968  Woltche _____ 350—214

DAVID SCHOUBERG, Primary Examiner

P. A. SACHER, Assistant Examiner

U.S. Cl. X.R.

350—215